United States Patent [19]
Crane et al.

[11] Patent Number: 6,053,664
[45] Date of Patent: Apr. 25, 2000

[54] ELASTOMERIC COMPOSITE BUMPER SYSTEM AND METHOD FOR ABSORBING HIGH ENERGY IMPACT

[75] Inventors: Roger M. Crane, Arnold, Md.; Kathleen A. Corona-Bittick, Cincinnati, Ohio; Donald James Dorr, Lake St. Louis, Mo.

[73] Assignee: The United States of America as represented by the Secretary of the Navy, Washington, D.C.

[21] Appl. No.: 09/012,007

[22] Filed: Jan. 22, 1998

Related U.S. Application Data

[60] Provisional application No. 60/038,133, Mar. 3, 1997.

[51] Int. Cl.$^7$ ........................................... E02B 3/26
[52] U.S. Cl. .................. 405/215; 405/211; 405/212; 405/213; 114/219; 114/220
[58] Field of Search .................... 405/211, 212, 405/213, 214, 215; 114/219, 220

[56] References Cited

U.S. PATENT DOCUMENTS

| | | | |
|---|---|---|---|
| H402 | 1/1988 | Julian et al. ............................ | 405/212 |
| 2,417,849 | 3/1947 | Walters et al. ...................... | 405/213 X |
| 3,254,491 | 6/1966 | Levinton ............................. | 114/219 X |
| 3,426,542 | 2/1969 | Hindman et al. ................... | 114/219 X |
| 3,585,958 | 6/1971 | Naczkowski ....................... | 405/215 X |
| 3,653,613 | 4/1972 | Palmer et al. . | |
| 3,782,769 | 1/1974 | Fader et al. . | |
| 3,817,566 | 6/1974 | Keijzer et al. . | |
| 3,834,686 | 9/1974 | Moritz et al. . | |
| 3,870,009 | 3/1975 | Liddell ................................ | 405/211 X |
| 3,899,623 | 8/1975 | Okazaki et al. . | |
| 3,948,500 | 4/1976 | Korbuly et al. .................... | 114/219 X |
| 4,054,311 | 10/1977 | Gute . | |
| 4,054,312 | 10/1977 | Strader, Jr. . | |
| 4,057,236 | 11/1977 | Hennels . | |
| 4,233,359 | 11/1980 | Mimura et al. . | |
| 4,273,065 | 6/1981 | Lindsay et al. ........................ | 114/219 |
| 4,278,726 | 7/1981 | Wieme . | |
| 4,296,705 | 10/1981 | Uruta et al. ............................ | 114/219 |

(List continued on next page.)

OTHER PUBLICATIONS

Elastomeric Composite Bumpers, Final Technical Report, sponsored by the Office of Naval Research, Jan. 5, 1996 to Jul. 5, 1996, Contract No. N00014–9G–C–5004.

Elastomeric Composite Bumpers, Monthly Technical Progress Report, Sponsored by the Office of Naval Research, Feb. 5, 1996 to Mar. 5, 1996, Contract No. N00014–9G–C–5004.

*Primary Examiner*—David Bagnell
*Assistant Examiner*—Jong-Suk Lee
*Attorney, Agent, or Firm*—Howard Kaiser

[57] ABSTRACT

The impact absorption system uniquely features arrangement of composite structures which include fiber-reinforced high strain-to-failure viscoelastic matrix material. According to many embodiments, a gravitationally or buoyantly suspended hollow fiber-reinforced urethane reaction bumper is closely and anteriorly situated with respect to fiber-reinforced urethane tension tubes which are secured at the ends and disposed in an approximately vertical plane. In operation, an incoming marine vessel impacts the bumper which in turn impacts the tubes. The invention takes advantage of the great deformability, high energy absorbency and other beneficial properties of fiber-reinforced high strain-to-failure viscoelastic matrix material. Moreover, applicability/adaptability of individual bumper systems to varieties of marine vessels is made possible through analysis and arrangement/rearrangement/exchange/interchange of structural components. The bumper and the tension tubes can be designed and selected on individual and collective bases.

25 Claims, 7 Drawing Sheets

U.S. PATENT DOCUMENTS

| | | | |
|---|---|---|---|
| 4,351,257 | 9/1982 | Brown, Jr. | 114/219 |
| 4,651,445 | 3/1987 | Hannibal . | |
| 4,804,296 | 2/1989 | Smath | 405/212 |
| 4,812,348 | 3/1989 | Rau . | |
| 4,863,416 | 9/1989 | Gupta . | |
| 4,883,013 | 11/1989 | Lin | 114/219 |
| 4,919,572 | 4/1990 | Bergfelder | 405/212 |
| 4,938,163 | 7/1990 | Capron | 114/219 X |
| 4,954,377 | 9/1990 | Fisher et al. . | |
| 5,030,490 | 7/1991 | Bronowicki et al. . | |
| 5,037,242 | 8/1991 | Nill | 405/215 |
| 5,042,859 | 8/1991 | Zhang et al. . | |
| 5,087,491 | 2/1992 | Barrett . | |
| 5,106,137 | 4/1992 | Curtis . | |
| 5,108,262 | 4/1992 | Crane . | |
| 5,108,802 | 4/1992 | Sattinger . | |
| 5,250,132 | 10/1993 | Lapp et al. . | |
| 5,256,223 | 10/1993 | Alberts et al. . | |
| 5,261,616 | 11/1993 | Crane et al. . | |
| 5,308,675 | 5/1994 | Crane et al. . | |
| 5,348,052 | 9/1994 | Crane et al. . | |
| 5,447,765 | 9/1995 | Crane . | |
| 5,458,077 | 10/1995 | Enami et al. | 114/219 |
| 5,503,879 | 4/1996 | Cochran . | |
| 5,573,344 | 11/1996 | Crane et al. . | |
| 5,653,425 | 8/1997 | Page et al. . | |
| 5,654,053 | 8/1997 | Crane et al. . | |
| 5,693,166 | 12/1997 | Crane . | |
| 5,744,221 | 4/1998 | Crane et al. . | |

ELASTOMERIC COMPOSITE BUMPER SYSTEM AND METHOD FOR ABSORBING HIGH ENERGY IMPACT

CROSS-REFERENCE TO RELATED APPLICATIONS

This application claims the benefit of U.S. Provisional Application Ser. No. 60/038,133, filed Mar. 03, 1997, incorporated herein by reference.

This application is related to U.S. application Ser. No. 08/237,579, filed May 03, 1994, now U.S. Pat. No. 5,744,224 incorporated herein by reference, and to U.S. application Ser. No. 08/491,047, filed Jun. 15, 1995, now U.S. Pat. No. 5,654,053, incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods and apparatuses for absorbing impact from structures, more particularly to such methods and apparatuses which are implemented at berthing locations for absorbing impact from marine vessels.

"Fenders" are bumpers which are utilized at docks, wharves, piers, moorages and anchorages for absorbing kinetic energy of berthing marine vessels. A fender absorbs kinetic energy of the berthing vessel by converting the kinetic energy into potential energy in the fender material system.

Fender systems have been used, or considered for use, wherein the potential energy is realized essentially in at least one of the following forms: deflection of a fender pile; compression of a rubber fender component; deformation of a foam-filled fender; torsion of a fender's cylindrical shaft; pressurization of a pneumatic fender; fluid motion/pressurization of a hydraulic fender.

Foam-filled fenders generally comprise a resilient, closed-cell foam wrapped with an elastomeric skin. The cellular structure of the foam reacts like individual pneumatic fenders by absorbing energy through deformation. The foam-filled fenders have high energy absorbing capabilities with relatively small reaction force and can float with the tide, handling several surface ship types. Since foam-filled fenders are typically large, they can act as a separator and provide a good standoff.

The U.S. Navy is currently utilizing composite materials in the fabrication of foam-filled fenders for berthing ships. The current design of a foam-filled fender for U.S. Naval ships includes a cylinder having a urethane foam core, overwraps of nylon, and a urethane sprayed over the cylindrical surface. The U.S. Navy's foam-filled fender system has demonstrated effectiveness in terms of reacting certain kinds of ship loads against piers, but has yet to be engineered for generic applications.

The U.S. Naval fenders currently in use are fabricated for a particular class of ship. U.S. Naval vessels which are characterized by different displacements require different fenders to be employed; one reason for this has been the U.S. Navy's need to ensure that a particular U.S. Naval ship's hull loading is maintained below a specific level. Furthermore, fenders of current U.S. Naval design are fixed in terms of the amount of energy which can be reacted. In order to absorb more energy, more or larger current U.S. Naval fenders are required.

Although the U.S. Navy's current foam-filled fender design has been successful in certain modes of practice, it does not lend itself to an analytical design methodology using current design tools. The method for fabricating the U.S. Navy's current foam-filled fender includes wrapping a urethane foam core with nylon fiber, and spraying urethane onto the fiber as it is wound onto the urethane core material; this technique results in operator-to-operator variance in urethane coating thickness or fiber volume fraction.

Accordingly, the mechanism of energy absorption cannot be accurately modeled for current U.S. Navy foam-filled fender systems. The efficacy of a given U.S. Navy foam-filled fender for a particular application requires independent empirical verification. Due to this incapability of advance fender design, the U.S. Navy's current foam-filled fender system necessarily lacks the versatility to predictably adapt to various configurations of marine vessel and/or berth.

Current U.S. Navy fenders are experiencing significant design overloads and are being replaced at an annual cost of millions of dollars per year. Moreover, many pier structures owned by the U.S. Navy and other entities are decrepit or dilapidated. Aging or deteriorating pier structures require renewed analysis to account for degrading mechanical properties. If analytical procedures are not soon established, existing pier structures may be prematurely replaced.

SUMMARY OF THE INVENTION

In view of the foregoing, it is an object of the present invention to provide a bumper/fender system which can be used effectively for absorbing impact of a variety of marine vessels at a variety of berthing stations.

Another object of the present invention is to provide such a bumper/fender system which can be thus used for both large and small marine vessels.

It is a further object of this invention to provide such a bumper/fender system which admits of analytical modeling for purposes of predicting such varied usage.

A further object of this invention is to provide such a bumper/fender system which is economical.

In accordance with the present invention, apparatus is provided for absorbing the impact of a relatively moving body. The inventive apparatus comprises at least two composite structures and at least one housing. Each composite structure includes fiber-reinforced high strain-to-failure viscoelastic matrix material. At least one composite structure is a bumper for initially receiving the body. At least one composite structure is a deformer for consequently receiving a bumper. Each housing is for securing at least one deformer and for suspending at least one bumper. Each bumper is situated adjacent at least one deformer.

For many embodiments of the inventive apparatus, at least one bumper is a cylindroid bumper which includes a hollow cylindrical axially intermediate portion and two protuberant axially extreme portions. Each said bumper being approximately horizonally disposed. At least two deformers are tubular deformers which are associated with a cylindroid bumper. Each tubular deformer is fastened at both ends and is approximately vertically disposed.

The inventive bumper system is versatile. According to the inventive bumper system, various system elements and components can be designed to broaden applicability to a varieties of marine vessels. A marine vessel's contact region can be designed to keep the hull loading below a specific threshold value. The inventive bumper system features a type of modularity of structural units. The tension tubes have the exchangeability and interchangeability to dissipate varying berthing loads in the context of the same inventive system configuration. Furthermore, because the tension tubes constitute the primary energy-absorbing mechanism and respond in accordance with well known elasticity theory, the tension tubes can be easily designed.

In addition, because of its modular quality, the inventive bumper system should be capable of allowing ship berthing to much higher speeds; such capability would be expected to lower shipping costs due to shorter turnaround times. Moreover, the materials utilized for the present invention have demonstrated long term durability in sea water environments, and therefore should be capable of greater longevity than are the fenders which are currently being used.

The inventive fenders can readily be tailored and analyzed and can have sufficient versatility and universality for utilization in connection with varieties of marine vessels and berthing stations. The inventive fender system is susceptible of analysis using conventional techniques and is tailorable to numerous pier configurations as well as to numerous types and sizes of ships and other marine vessels. The present invention permits anticipatory tailoring of fenders for desired applications so as to avoid overpressurization on the prospectively impacting marine vessel hulls.

Furthermore, the capability of the inventive fender system to allow for higher berthing speeds without overloading either pier structures or ship hulls will greatly benefit both U.S. Naval and commercial shipping. Commercially, for both container traffic and ferry traffic, the increased berthing speeds will result in shorter times for off-loading and on-loading.

Crane et al. in copending U.S. patent application Ser. No. 08/237,579 filed May 03, 1994, now U.S. Pat. No. 5,744,224 entitled "Flexible High-Damping Composite Structures and Fabrication Thereof," incorporated herein by reference, disclose unique composite structures which are made using conventional resin transfer molding ("RTM") technique or conventional filament winding technique. According to Crane et al. U.S. Pat. No. 5,744,224 high strain-to-failure viscoelastic material (such as, for example, polyurethane or polyurethane/urea) is used as the matrix material in association with conventional RTM or conventional filament winding; i.e., fiber fabric material or individually stranded fiber tow material is used as the fiber reinforcement material for high strain-to-failure viscoelastic matrix material. The structures disclosed by Crane et al. U.S. Pat. No. 5,744,224 afford desired structural performance and superior performance in terms of flexibility, damping and damage-tolerance.

Crane et al. in copending U.S. patent application Ser. No. 08/491,047 filed Jun. 15, 1995, now U.S. Pat. No. 5,634,053 entitled "High-Energy-Absorbing Enclosure for Internal Explosion Containment," incorporated herein by reference, adopts the teachings of Crane et al. U.S. Pat. No. 5,744,224 particularly insofar as such teachings pertain to the making of composite structures using conventional RTM and the use of fiber fabric material as the fiber reinforcement material for high strain-to-failure viscoelastic matrix material. Crane et al. U.S. Pat. No. 5,634,053 disclose utilization of polyurethane as a highly viscoelastic matrix material, having strain-to-failure of 400% to 500%, compared to a conventional polymer used in composites which has a strain-to-failure on the order of 5% to 10%. Crane et al. U.S. Pat. No. 5,634,053 also disclose utilization of polyurethane in combination with urea ("polyurethane/urea") as a highly viscoelastic matrix material having properties similar to polyurethane alone. The disclosure of Crane et al. U.S. Pat. No. 5,634,053 uniquely features utilization of fiber-reinforced high strain-to-failure viscoelastic matrix material in the context of explosion containment.

The present invention uniquely features utilization of fiber-reinforced high strain-to-failure viscoelastic matrix material in the context of impact absorption. This invention adopts the teachings of Crane et al. U.S. Pat. No. 5,744,224, particularly insofar as such teachings pertain to the making of composite structures using conventional filament winding and the use of individually stranded fiber tow material as the fiber reinforcement material for high strain-to-failure viscoelastic matrix material. Filament wound fiber-reinforced high strain-to-failure viscoelastic matrix material comprises a plurality of single-stranded tows and high strain-to-failure viscoelastic matrix material contiguously disposed in relation to at least some of the tows. The fiber-reinforced high strain-to-failure viscoelastic matrix material can be deformed elastically to large strains, has demonstrably high energy-absorbing characteristics, and is relatively light-weight.

The elastic properties and other beneficial properties of fiber-reinforced high strain-to-failure viscoelastic matrix material avail the present invention. This invention uniquely configures structures inclusive of fiber-reinforced high strain-to-failure viscoelastic matrix material so as to provide a highly effective system for impact absorption.

Filament winding is a technique which is known in the art for the manufacture of cylindrical structures (e.g., tubes and pipes), spherical structures, and other surfaces of revolution. Typically, the filament winding process involves utilization of a resin bath through which dry fibers are passed and then wound; this type of filament winding is known as "wet winding." In this technique the wind angle, band width and tow tension are controlled. Alternatively, the filament winding process typically utilizes prepreg tape in favor of wet winding technique in order to achieve tighter control on fabricated properties. The filament winding art has conventionally utilized, for structural applications, fibers having appropriate strength characteristics (e.g., glass or carbon fibers) in conjunction with a conventional (e.g, epoxy) resin matrix.

Inventive implementation of conventional filament winding technique advantageously permits precise selectivity of the fiber content of each composite structure in terms of both fiber volume fraction and fiber orientation; hence, the inventive bumper system uniquely lends itself in these respects to modulation or "fine tuning" in accordance with system requirements.

In inventive practice, the structural considerations for most embodiments will require that each composite structure have a fiber content of at least about 50% by volume. For many inventive embodiments, the content in each composite structure of the single-stranded tows is preferably in the range from about 50% to about 70% by volume.

Besides fiber volume fraction and fiber orientation, other inventive bumper system parameters which can selectively be varied or adapted in accordance with application requirements include: size and shape of each composite structure; matrix material for each composite structure; number and arrangement/configuration of the composite structures; the internal contents of each composite bumper structure.

According to this invention, the composite bumper structure can contain a fluid, either gaseous (e.g., air) or liquid (e.g., water), or can contain a foam material. If the contents are fluid, the pressurization can be regulated. If the fluid contents are gaseous (i.e., the bumper is "pneumatic"), the gas can be preferentially vented. If the fluid contents are liquid (i.e., the bumper is "hydraulic"), the motion of the liquid can be controlled.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawing, wherein like numbers indicate the same or similar components, and wherein.

DETAILED DESCRIPTION OF THE INVENTION

Incorporated herein by reference is the following report which was issued pursuant to SBIR contract between the U.S. Navy and "performing organization" Production Products Manufacturing & Sales Company, Inc., 1285 Dunn Road, St. Louis, Mo.: *Elastomeric Composite Bumpers,* Final Technical Report, Jan. 5, 1996 to Jul. 5, 1996, sponsored by the Office of Naval Research (ONR), Contract No. N00014-96-C-5004, Contract Effective Date Jan. 5, 1996, Contract Expiration Date Jul. 6, 1996; "Distribution authorized to U.S. Government agencies only; report contains proprietary data produced under SBIR contract. Other requests shall be referrred to the performing organization listed above."

Figure 1:
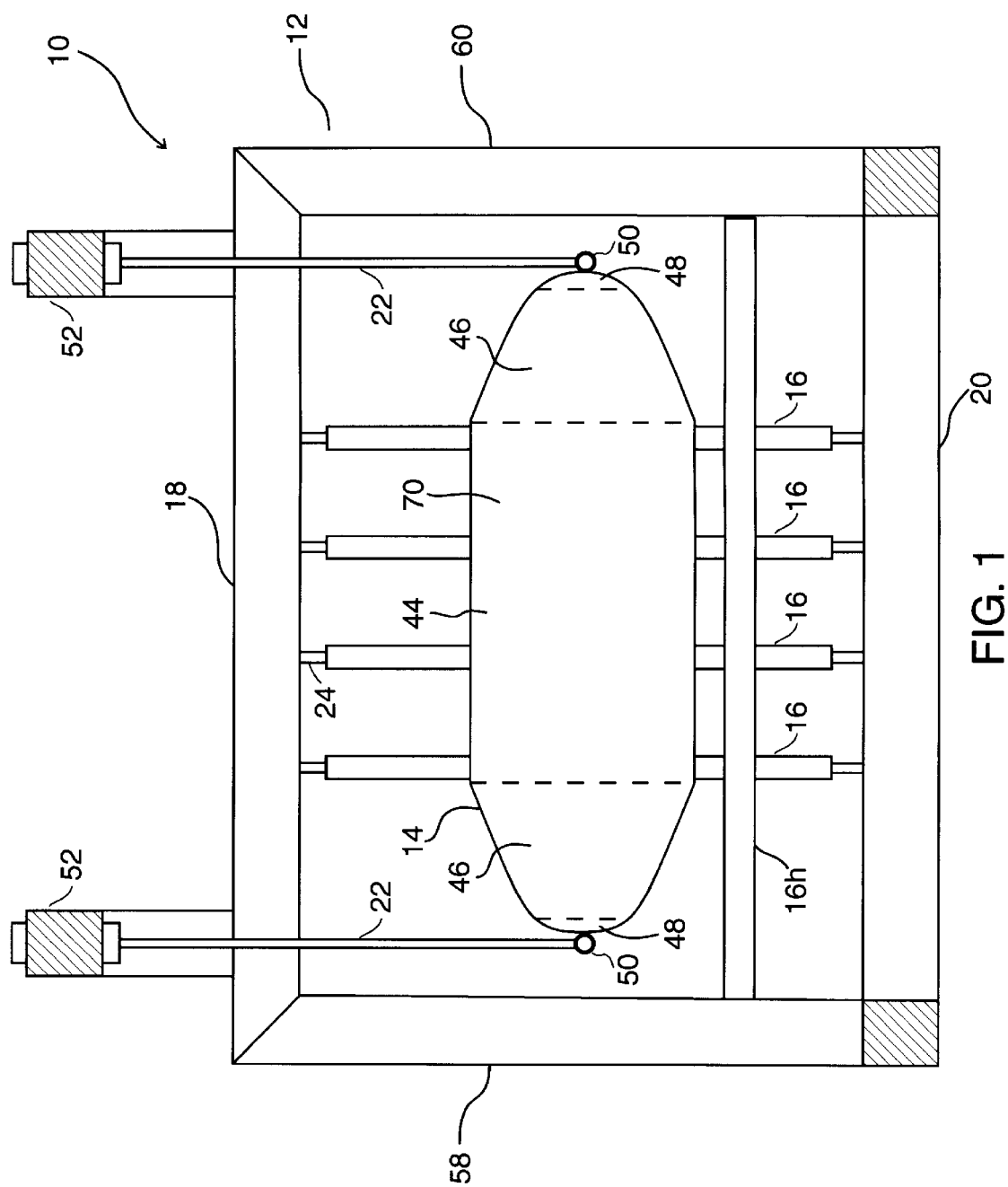
FIG. 1 is a diagrammatic front elevation view of an embodiment of an inventive bumper system wherein a cylindroid bumper is implemented.
Figure 2:
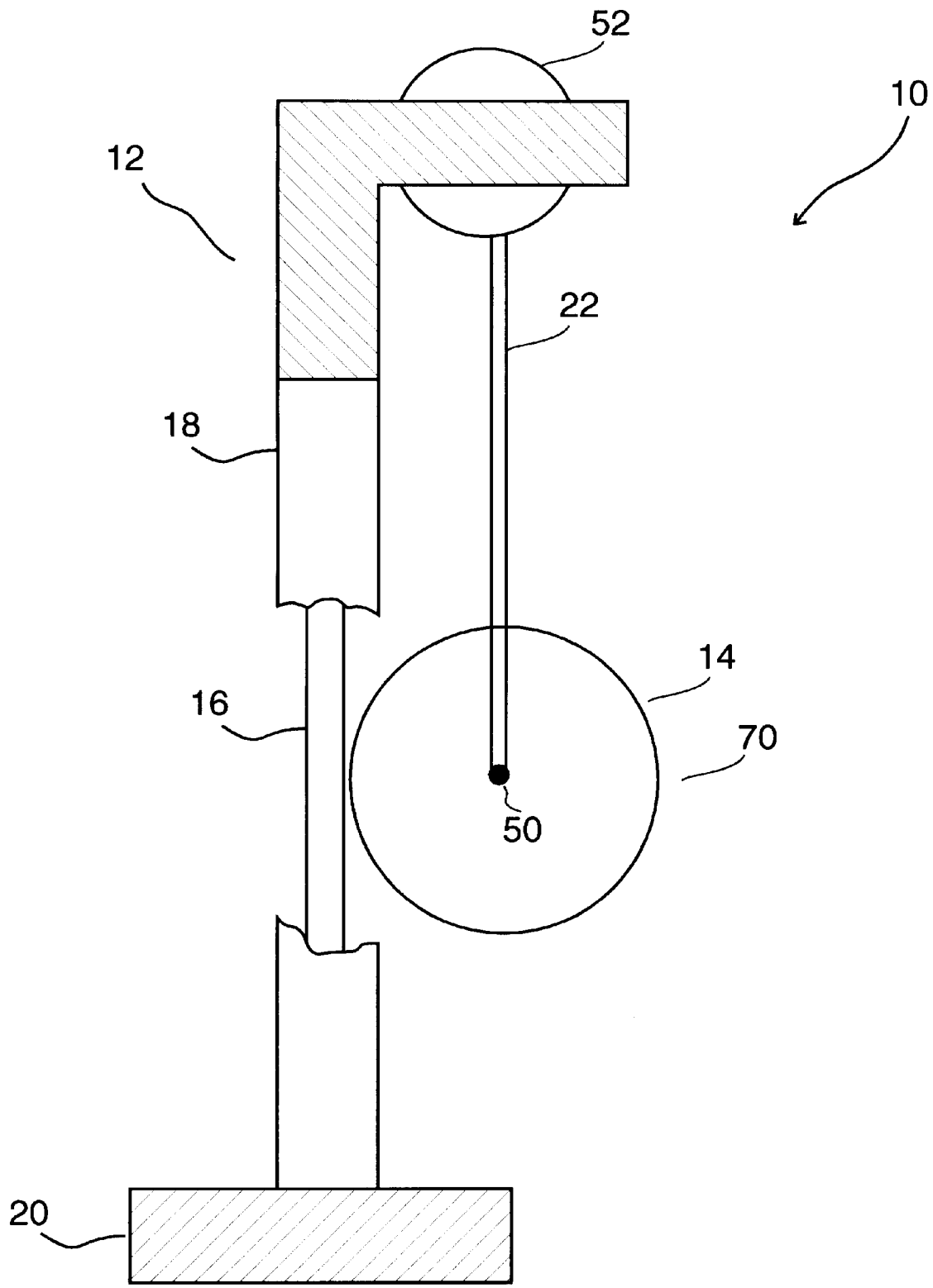
FIG. 2 is a diagrammatic end elevation view, partially cut away, of the inventive embodiment shown in FIG. 1.

Referring now to FIG. 1 and FIG. 2, inventive fender system 10 principally includes a rigid or semi-rigid framework 12, an approximately horizontal hollow glass fiber-reinforced polyurethane reaction fender 14, and four approximately vertical glass fiber-reinforced polyurethane tension tubes 16.

Framework 12 serves as a support fixture for fender 14 and tension tubes 16. Framework 12 is a substantially upright structure which includes a generally horizontal upper framework portion 18 and a generally horizontal lower framework portion 20. Depending on the inventive embodiment, framework 12 is fixedly attached (so as to be set) to another structure (e.g., a pier or pile, not shown in the figures) or unfixedly attached (so as to be permitted to float) to such a structure.

Reaction fender 14 as shown in FIG. 1 and FIG. 2 is conventional in appearance and is positioned propinquantly in front of tension tubes 16, slightly touching or nearly touching tension tubes 16. Reaction fender 14, similar in cylindroid shape to many existing bumpers, includes cylindrical fender portion 44 and two dome-like fender end portions 46. Reaction fender 14 is poised for being loaded by a marine vessel at the longitudinal front side 70 of cylindrical fender portion 44. Reaction fender 14 is suspended loosely by one or more lines, wires, ropes, belts, cords or cables, such as the two ropes 22 shown in FIG. 1, which are attached to upper framework portion 18. Ropes 22 are attached to fender 14 by engaging threaded eyebolts 50 which join plug assemblies 48 at the two axially extreme ends of fender end portions 46.

Alternatively, according to various inventive embodiments, a reaction fender such as fender 14 is suspended in a manner other than by hanging (i.e., gravitationally). For example, a reaction fender can be buoyantly suspended. For instance, buoyant fender 14 can be permitted to float while being mechanically restricted (e.g., by guides, rails or slides) to essentially vertical movement.

Fender 14 is shown to be disposed approximately medially in relation to tension tubes 16. In accordance with this invention, fender 14 can be variously oriented in relation to tension tubes 16. For example, situating fender 14 in either a higher or lower position, as compared with the approximate middle position shown in FIG. 1 and FIG. 2, will alter the characteristics, e.g., the reaction loads and deflections, of fender system 10. Some inventive embodiments include, connected to one or more housings such as framework 12, one or more pulley mechanisms, such as two pulleys 52, for selectively raising or lowering one or more fenders such as fender 14.

Tension tubes 16 are mounted approximately vertically, using swivel ring assemblies 24, so as to permit substantially free rotation during loading. This rotatability feature was believed to be critical to the performance of the tension tubes 16 during the testing which was conducted pursuant to the above-noted SBIR contract between the U.S. Navy and Production Products Manufacturing & Sales, since this rotatability feature permitted the lateral loading imposed from fender 14 to virtually be translated into pure tension in tension tubes 16. The swivel ring assemblies 24 which were utilized for testing included clamps, plugs and swiveling hoist rings. Metal clamps were used to hold the outside diameter at the tube 16 ends, and metal plugs were bonded inside the tube 16 ends (e.g., using epoxy adhesive). At both the top ends and the bottom ends of tension tubes 16, the plugs were attached to swiveling hoist rings. The swiveling hoist rings were connected at the tension tube 16 top ends to upper framework portion 18, and at the tension tube 16 bottom ends to lower framework portion 20.

For some inventive embodiments, one or more tension tubes 16*h* are mounted approximately horizontally and engage, in crisscross fashion, approximately vertical tension tubes 16. Tension tubes 16*h*, one of which is illustrated, are supported using generally vertical lateral framework portions 58 and 60. For example, in inventive embodiments wherein swiveling approximately vertical tension tubes 16 are implemented, the approximately vertical tubes 16 can be made to react in unison by passing them through, at intersection locations 56, openings provided in approximately horizontal tubes 16h; this tension tube configuration would increase the reaction force which inventive bumper system 10 could experience.

In accordance with various inventive embodiments, a tension tubes can be disposed in any direction within an approximately vertical plane, can either have or lack swivelability, and can have no pre-tensioning or any of varying degrees of pretensioning. For instance, approximately vertical tension tubes 16 as shown in FIG. 1 and FIG. 2 employ swiveling hoist rings 24 and are not pre-tensioned. Alternative inventive embodiments can provide tension tubes such as tension tubes 16 and 16h which are, to greater or lesser extents, tautly fastened with respect to a housing such as framework 12.

Generally speaking, during operation of fender system 10, an incoming ship impacts fender 14, whereupon fender 14 impacts tension tubes 16. To elaborate, in terms of basic mechanics, fender system 10 essentially functions as described hereinbelow.

Fender 14 is utilized to initially react the incoming ship. Fender 14 is ready to be deflected (generally in the direction shown by unidirectional arrow i) by a marine vessel which strikes fender 14 (generally in the same direction shown by unidirectional arrow i). When the ship impacts fender 14, buckling elastomeric composite fender 14 acts as a mechanical force which absorbs energy. Fender 14 is configured so as to not overload the ship's hull and to provide an adequate target for the incoming ship.

Once fender 14 begins to partially deform, fender 14 begins to transfer loading to tension tubes 16. Fender 14 impacts tension tubes 16, thereby placing tension tubes 16 in tension, thereby further absorbing energy through the stretching of tension tubes 16. Tension tubes 16 are designed to make maximum use of the energy-absorbing properties of polyurethane by tailoring the ply lay-up to get the optimum load stroke curve. Tension tubes 16 deform as an elastic tube in bending, which is a well characterized mode of deformation.

Since each tension tube 16 is made using a fiber-reinforced urethane, there is both a bending component as well as a necking component of its deformation as it is deformed approximately normal to its axis. There is reorientation of the fibers of tension tubes 16, and there is compression of the urethane material of tension tubes 16; the compression results from the fiber motion of tension tubes 16. As a consequence of the fiber reorientation and the urethane compression, fender system 10 becomes increasingly stiff; i.e., fender system 10 becomes decreasingly compliant and increasingly resistant to the inward motion of the ship.

In tension tubes 16, the urethane material properties vary with loading for the reason that the urethane material is confined between the fibers and is subject to compression; hence, the mechanical properties of the urethane change from elastic properties to bulk properties, whereby there is an increase in the effective stiffness of tension tubes 16 by about two to three orders of magnitude.

In accordance with the present invention, the loading upon reaction fender 14 and tension tubes 16 is generally expected to occur over a period of several seconds, thus resulting in low loads on both fender system 10 and the ship's hull. Accordingly, the ship is effectively reacted in a forgiving manner.

Pursuant to the above-noted SBIR contract between the U.S. Navy and Production Products Manufacturing & Sales, a series of tests was conducted on fender system 10. Fender system 10 was developed during "Phase I" of the contract. Large scale demonstration apparatus 26 was built and implemented to demonstrate the operation of fender system 10.

Figure 3:
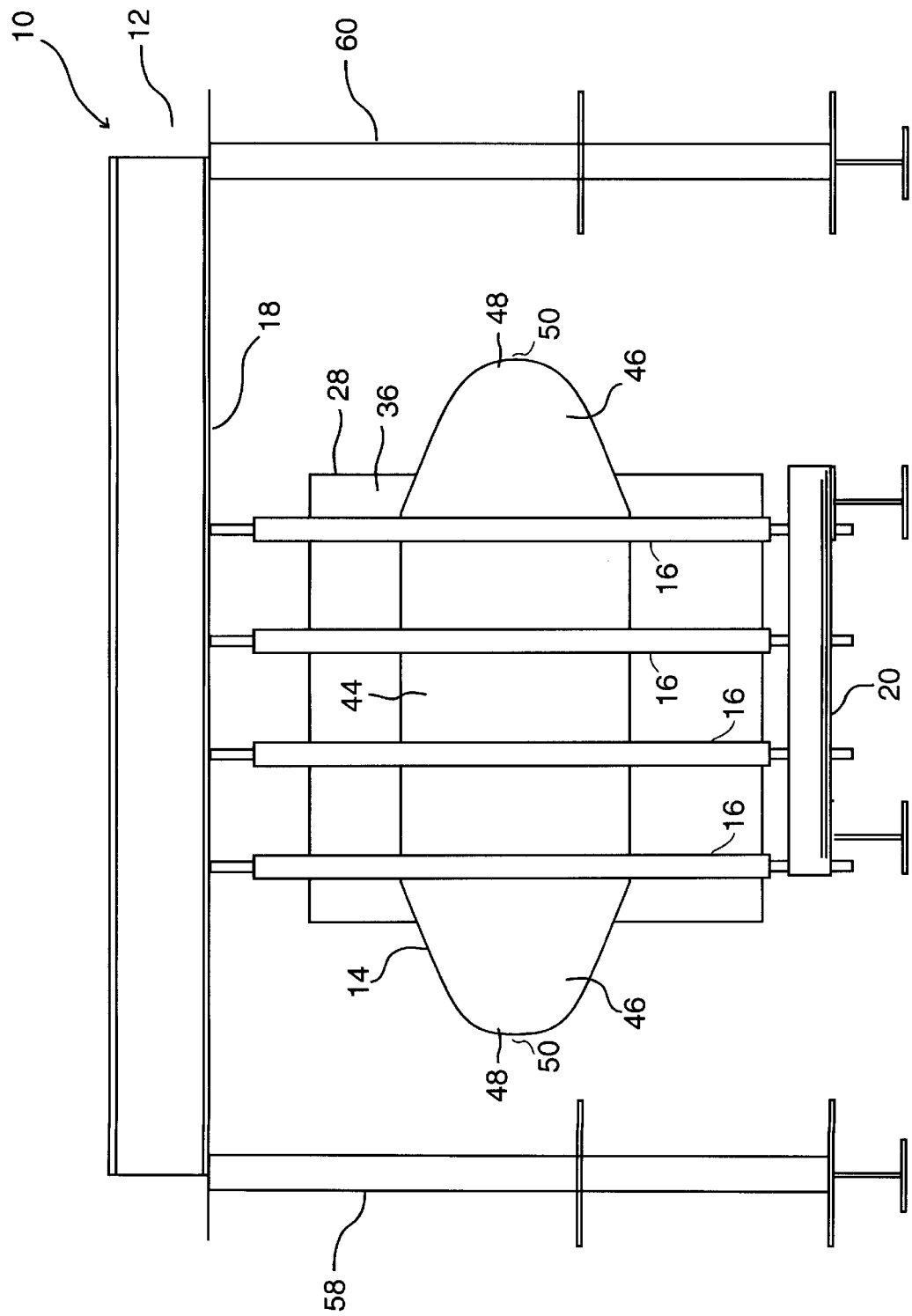
FIG. 3 is a diagrammatic back longitudinal elevation view of an inventive embodiment similar to the inventive embodiment shown in FIG. 1, and of testing apparatus which was used to simulate the berthing of a marine vessel.
Figure 4:
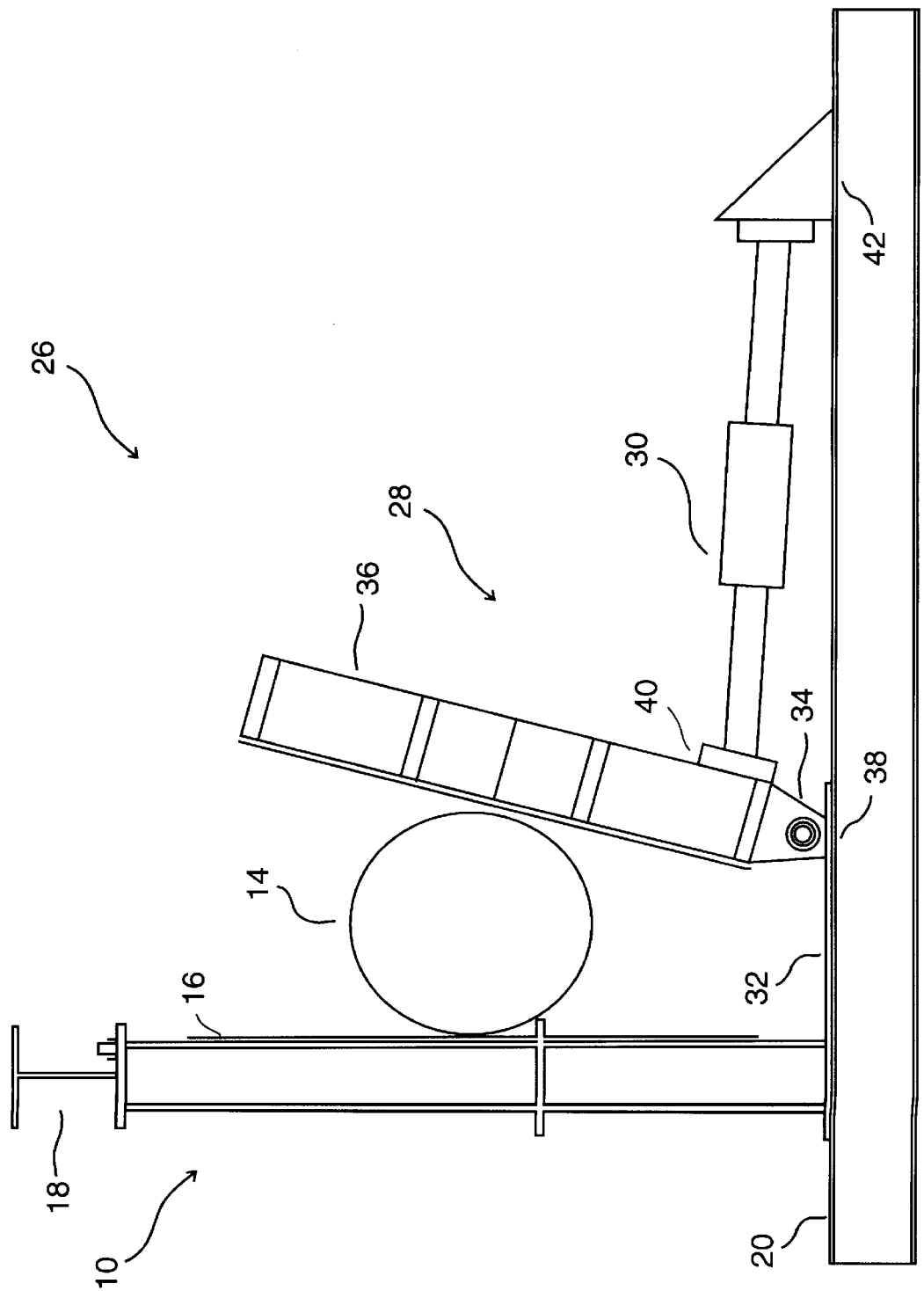
FIG. 4 is a view, similar to the view shown in FIG. 2, of the inventive embodiment and testing apparatus shown in FIG. 3.

With reference to FIG. 3 and FIG. 4, demonstration apparatus 26 included fender system 10 and hydraulic loading system 28. Hydraulic loading system 28 was used for simulating the berthing of a ship. Hydraulic loading system 28 included hydraulic actuator 30, test floor 32, hinge 34 and paddle 36.

For the purposes of the testing which was conducted using demonstration apparatus 26, lower framework portion 20 was effectively made a part of a more extensive test floor 32. Upper framework portion 18 and ropes 22 are not shown but may be envisioned, with upper framework portion 18 located above the shown demonstration apparatus 26. Actuator 30 and paddle 36 were separately coupled with test floor 32. Paddle 30, basically a large-area wooden loading platform, engaged test floor 32 at location 38 via a lever arm mechanism including hinge 34. Actuator 30 was attached to paddle 30 at location 40 and to test floor 32 at location 42.

Fender system 10 was thus loaded by paddle 36 which was mounted on hinge 34 which was connected to test floor 32. Paddle 36 provided a large, flat loading panel to simulate the side of a ship hitting reaction fender 14. Hydraulic loading system 20 was capable of moving paddle 30 up to speeds of about three miles per hour. The capabilities of the test hardware permitted production of requisite displacements and displacement rates on fender 14.

Demonstration apparatus 26 was instrumented with deflectometers to determine the deformation of fender system 10 as a function of load. Fender system 10 was instrumented with six strain gages and one LVDT in addition to the load and displacement measured at actuator 30. One axial strain gage was 5 placed at the center of each tension tube 16. An LVDT was placed at the center of fender 14 to measure the deflection of the back of fender 14 and the approximate deflection of the two middle tension tubes 16. Fender system 10 was loaded at varying rates and put through numerous cycles, in order to assess the elastic characteristics of fender system 10.

Inventive fender system 10 represents a multi-element approach to energy absorption. Fender system 10 can be tailored to optimize the interaction between fender 14 and tension tubes 16. Tension tubes 16 are efficient vehicles for energy absorption particularly because the fiber angles can be tailored to transfer energy into the highly viscoelastic matrix material. Tension tubes 16 can be designed to make maximum use of the energy-absorbing properties of the highly viscoelastic matrix material by tailoring the ply lay-up to obtain the optimum load stroke curve. Fender 14 can be tailored to meet bumper design requirements with the load stroke curve optimized and the hull load minimized. In this regard, fender 14 can be made to include an internal fender system which is pneumatic, foam or hydraulic.

According to this invention, both reaction fender 14 and tension tubes 16 are made via filament winding using highly viscoelastic material so as to have a high fiber volume and no cores With regard to both fender 14 and tubes 16, the fiber-reinforced high-strain-to-failure matrix material has unique absorption properties, can be deformed severely and still return to it's original shape, and has excellent damage tolerance and abrasion resistance. Highly viscoelastic matrix material performs very well at large strains and, in general, exhibits a remarkable ability to return to form. Although highly viscoelastic matrix material suffers from an initial loss of stiffness when subjected to large tensile strains, this material can then be cycled extensively with little further degradation.

The terms "high strain-to-failure viscoelastic material" and "highly viscoelastic material" are used herein interchangeably. The word "highly" in the term "highly viscoelastic material" is defined by either of two characteristics, viz., either "strain-to-failure" or "loss factor." A "highly viscoelastic material," as defined herein, is a viscoelastic material which either (a) has a loss factor in the range between about 0.4 and 0.8, or (b) has a strain-to-failure in the range between about 300% and 500%. Since a "high strain-to-failure viscoelastic material" (i.e., as defined herein, a viscoelastic material having a strain-to-failure in the approximate range of 300% to 500%) will virtually invariably have a loss factor in the approximate range of 0.4 to 0.8, and vice versa, the terms "high strain-to-failure viscoelastic material" and "highly viscoelastic material" are considered herein to be synonymous.

The term "fiber-reinforced highly viscoelastic matrix material," as considered herein, is synonymous with the term "fiber-reinforced high-strain-to-failure viscoelastic matrix material" and refers to composite material which includes fibers and highly (high strain-to-failure) viscoelastic matrix material which are, to a substantial degree, in a contiguous relationship; i.e., fiber-reinforced highly (high-strain-to-failure) viscoelastic matrix material is fiber-reinforced matrix material wherein the matrix material is highly (high strain-to-failure) viscoelastic matrix material.

Stated on page one (first paragraph) of Read, B. E., & Dean, G. D., *The Determination of Dynamic Properties of Polymers and Composites,* John Wiley & Sons, New York, 1978 is the following: "The low-strain mechanical behaviour of unreinforced and reinforced polymeric materials may be described as viscoelastic. In response to forces which vary sinusoidally with time their deformations will also be sinusoidal but, even at frequencies well below those required to excite sample resonance vibrations, will lag in phase behind the applied loads. The dynamic properties may then be specified by means of two basic quantities. One of these quantities, the dynamic storage modulus, provides a measure of the effective stiffness of the material and is proportional to the peak energy stored and recovered during each cycle of deformation. The other quantity, known as the loss factor or damping factor, is proportional to the ratio of net energy dissipated per cycle as heat to the peak stored energy." In accordance with Read et al.'s definition of "viscoelastic" as thus quoted, a "highly viscoelastic material" is suggested to be a viscoelastic material wherein the deformations significantly lag behind the applied force; this correlates with a material which has high damping.

With regard to damping and particularly with regard to loss factor, conventional metals have a loss factor of about 0.001. Structural composites have a loss factor in the approximate range of 0.007 to 0.015. A "lossy rubber" has a loss factor in the approximate range of 1 to 10; see Read et al., pages 190–195. A lossy rubber is a highly viscoelastic material which has virtually no structural characteristics and is used solely as a parasitic damping treatment (i.e., an add-on material). Highly viscoelastic materials having structural characteristics have a loss factor in the approximater range of 0.4 to 0.8, which is significantly higher than the loss factor for most structural materials but not as high as the loss factor for lossy rubber materials. These characterizations of materials are known to persons of ordinary skill in the art.

With regard to strain-to-failure, there are two types of organic matrices, viz., "thermoplastic" and "thermoset." For thermoplastic systems, the range of strain-to-failure is approximately 4% to 60%. For thermoset systems, the range of strain-to-failure is approximately 1.5% to 5%. Nicholls, David J., "Effect of Stress Biaxiality on the Transverse Tensile Strain-to-Failure of Composites, Whitney, James M., Editor, *Composite Materials: Testing and Design (Seventh Conference, Philadelphia,* 1984), American Society for Testing and Materials, Philadelphia, 1986, pages 109–114, is instructive regarding comparison of conventional thermoplastic and thermoset systems in terms of strain-to-failure. For thermoplastic composites, the absolute upper limit of strain-to-failure for conventional matrix materials is about 95% (see Nicholls, page 112, Table 1) or about 100% (see Nicholls, page 109, abstract: "Thermoplastic matrices are now available with neat resin strain-to-failure values of up to 100%.").

The ordinarily skilled artisan knows that conventional thermosets include polyester, vinylester and epoxy. Typical thermoplastics are known by the ordinarily skilled artisan to include PPS (polyphenylene sulfide), PEEK (poly ether ether ketone) and PEI (polyetherimide). These material systems are known to the ordinarily skilled artisan as conventional matrix composites.

The term "high strain-to-failure viscoelastic" is used in the instant disclosure to define a distinct genre of material which, according to the invention, is to be used as matrix material. The range of strain-to-failure for high-strain-to-failure viscoelastic materials is about 300% to 500%, more typically about 350% to 450%; this 300% to 500% strain-to-failure range represents a quantum jump vis-a-vis the strain-to-failure range for conventional matrix materials.

The aforedescribed disparity in terms of strain-to-failure for "conventional" materials versus "high strain-to-failure viscoelastic" materials is well understood in the art. Hence, the contradistinctive delimitations of the terms "conventional matrix material" and "high-strain-to-failure viscoelastic matrix material" are readily appreciated by the ordinarily skilled artisan who reads the instant disclosure.

Utilization of viscoelastic material as matrix material is disclosed by the following U.S. Pat. Nos. 4,954,377; 5,108,262; 5,308,675; 5,447,765. Fisher and Crane U.S. Pat. No. 4,954,377 disclose utilization of a highly viscoelastic material such as, for example, butyl or nitrile rubber, or any other highly viscoelastic material, that exhibits molecular interaction when subjected to shearing forces. Fisher and Crane U.S. Pat. No. 4,954,377 disclose that the general characteristics of the viscoelastic material in the cured condition are such as exhibit a capacity to withstand a high strain to failure and a high damping loss factor. Crane U.S. Pat. No. 5,108,262 discloses utilization of a highly viscoelastic matrix material such as urethane, polyurethane, nitrile rubber, or other such material having a high vibration damping loss factor. Crane et al. U.S. Pat. No. 5,308,675 disclose utilization of viscoelastic material including rubber such as natural and nitrile rubber, urethane, polyurethane, and other high strain to failure material (strain to failure greater than 60%) and which have a high damping loss factor (greater than 0.1).

For the above-described testing involving demonstration apparatus 26, tension tubes 16 were filament wound using E-glass and Adiprene L-100 polyurethane. Approximately, each tube 16 had a 2 inch inner diameter, four foot length and 0.25 inch thickness. Each tube 16 was fabricated using the filament winding process with ±45° plies. Since the outside diameter of each tube 16 was not machined after processing, thickness varied somewhat along the length of each tube 16 and among tubes 16. The total fiber content was, however, tightly controlled in the filament winding process; therefore, nominal dimensions were used for calculating stresses in tubes 16. The stress and strain values set forth in *Elastomeric Composite Bumpers*, Final Technical Report, supra, are engineering values based on the initial length and area.

Reaction fender 14 was made, using an affordable filament winding process, from E-glass and Adiprene L-100 polyurethane. Reaction fender 14 was filament wound using a ply schedule of $[+-30/90]_4$. During the wind, the plies built up thicker than anticipated; hence, the programmed ply schedule of $[+-30/90]_6$ and fender 14 thickness of 0.27 inches were not actually achieved. As a result of the ply build-up, the fiber volume of fender 14 was measured at about 26%, which is is much lower than the designed fiber volume of about 50%.

Cylindrical fender portion 44 which was made for testing approximately had a 44 inch axial length, a 21 inch inner diameter and a 0.372 inch thickness. Each domed fender end portion 46 approximately had a 16 inch axial length and a 6 inch inner diameter at the extreme end openings which were closed by plug assemblies 48.

To minimize cost in the program, an existing PPMS tool was used for fabrication of fender 14. Use of this PPMS tool necessitated the inclusion of a single lap splice joint in cylindrical portion 44 of fender 14, since the fender 14 part previously had to be removed from the PPMS tool. A cut-off ring was located near (about 4 inches from) one end of the cylindrical portion of the PPMS tool. The fender 14 part was separated into two pieces at the cut-off ring, removed from the PPMS tool and rebonded with a slight (about 4 inches) overlap.

A one-piece fender 14 would probably be preferable for many inventive embodiments, especially in terms of production costs and structural performance optimization. It is suggested that foam or washout tooling be considered for fabricating a one-piece fender 14.

After the filament winding was completed, two plug assemblies 48 were used to close out the domed end portions 46 of fender 14. Plug assemblies 48 served as valved pressurization fittings for changing the internal pressure during testing. Various testing was performed wherein the valves 50 were closed and fender 14 was selectively internally pressurized, and wherein the valves were opened so that the pressure inside fender 14 was atmospheric.

The fender 14 which was subjected to testing was filled with air, and hence was pneumatic in nature. In inventive practice, generally, wherein the bumper such as fender 14 contains a gas such as air, the bumper can be internally pressurized, have zero pressure or be vented. At the higher loading rates, somewhat higher efficiency appears to have been obtained with the fender 14 valves open. When the valves were open, fender 14 was acting, in effect, as a crude damper. It appears that controlling the rate at which air or some other fluid escapes from the bumper will permit the bumper to act as a damper, further improving performance.

Some inventive bumper embodiments contain foam material. The terms "foam" and "foam material" as used herein refer to any two-phase gas-solid material system in which the solid has continuity. Foam material is "spongelike" in that it has a cellular structure. The cells of a foam material can be closed, interconnected or a combination thereof. Foam materials vary in terms of greater rigidity versus greater flexibility.

For most embodiments and applications of the present invention wherein a bumper such as fender 14 contains foam material, the solid of the foam material is preferably a synthetic polymer or rubber. There are many conventionally known foam materials in this category, such materials being variously and generally interchangeably described as "plastic foams," "foamed plastics," "cellular polymers" and "expanded plastics." Varieties of other kinds and categories of foam materials, e.g., glass foams, ceramic foams and metal foams, are also conventionally known, and may be appropriately or preferably used for a given embodiment or application in practicing this invention.

The ordinarily skilled artisan is acquainted with the various types of foam material and their characteristics, and is capable of selecting a foam material which may be appropriately or preferably used as internal bumper contents in practicing any of the multifarious embodiments and applications of the present invention. See, e.g., Grayson, Martin, *Encyclopedia of Composite Materials and Components*, John Wiley & Sons, New York, 1983, "Foamed Plastics," pages 530–574; Lubin, George, *Handbook of Composites*, Van Nostrand Reinhold Company, New York, 1981, glossary (e.g., "foamed plastics," page 763); Brady, George S., Clauser, Henry R., *Materials Handbook*, McGraw-Hill, Inc., New York, 1991, pages 341–351 I("foam materials"); Lee, Stuart M., *Dictionary of Composite Materials Technology*, Technomic Publishing Co., Inc., Lancaster, Pa., 1989, e.g., page 61 ("foams").

Figure 5:
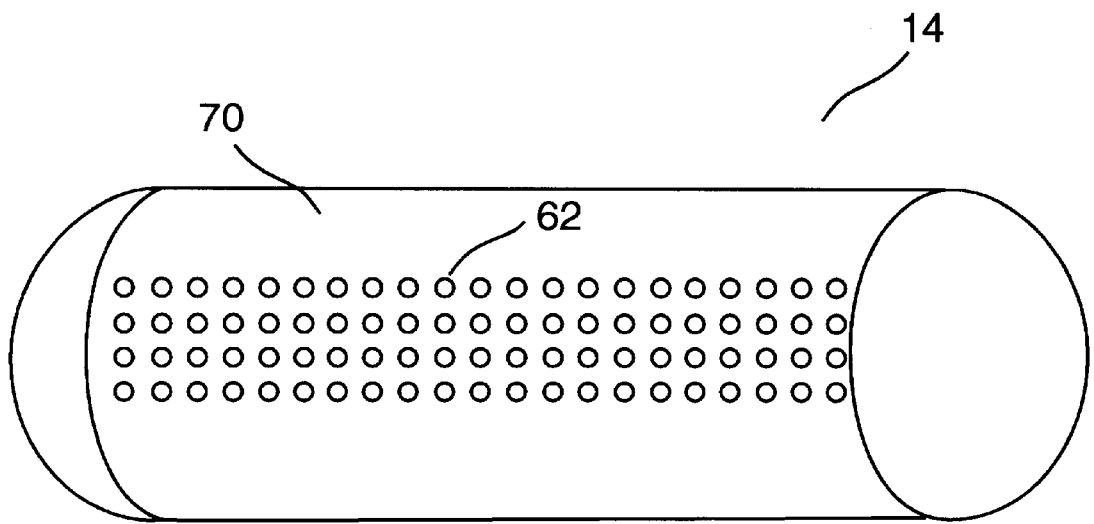
FIG. 5 is a diagrammatic perspective view of an inventive embodiment of an apertured cylindroid bumper.
Figure 6:
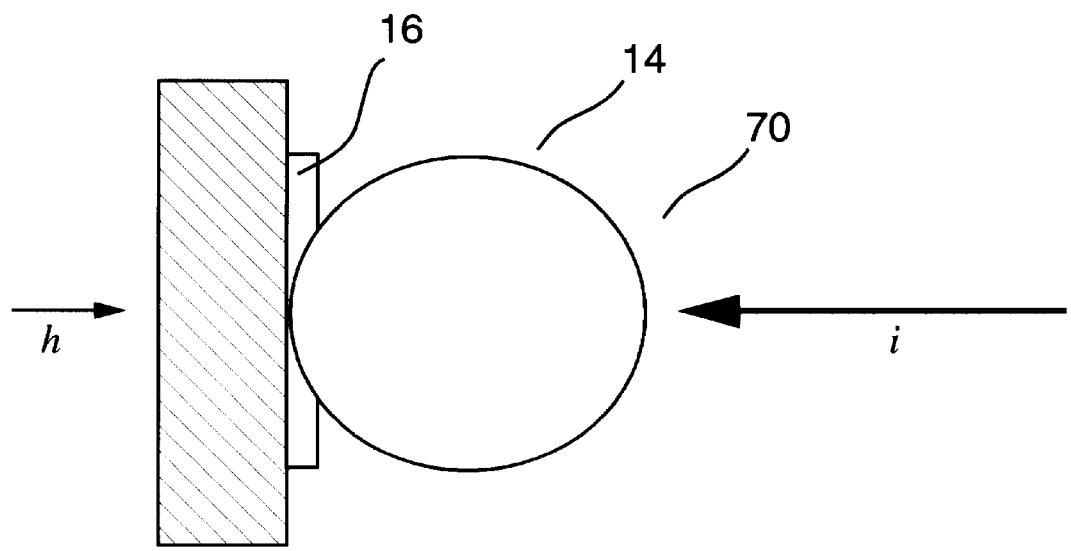
FIG. 6 is a diagrammatic end elevation view of the inventive embodiment shown in FIG. 5.

Some inventive bumper embodiments contain water. For some such inventive embodiments, a hydraulic fender is conceived to have a plurality of holes which serve to enhance the effectiveness of the fender system. For example, reference now being made to FIG. 5 and FIG. 6, hydraulic block buckling cylindroid fender 14, designed for side loading, has provided along its front (impact-taking) side 70 a longitudinal array of orifices 62 which lie in or about the approximately horizontal axial plane of fender 14.

As water-filled cylindroid fender 14 having orifices 62 is deflected by a ship (or other marine vessel), generally in the direction shown by unidirectional arrow i, water is forced out of orifices 62, generally in the direction shown by unidirectional arrow h, so as to create jets of water impinging upon and further slowing the ship. Water-filled fender 14 acts to exert a hydrodynamic force in addition to a mechanical force; thus, water-filled fender 14 creates a standing column of water to absorb energy in addition to that absorbed by the buckling elastomeric composite fender. Water-filled fender 14 returns to its extended position when the ship's motion stops. The water jets may also serve to reduce friction between the ship and water-filled fender 14.

Figure 7:
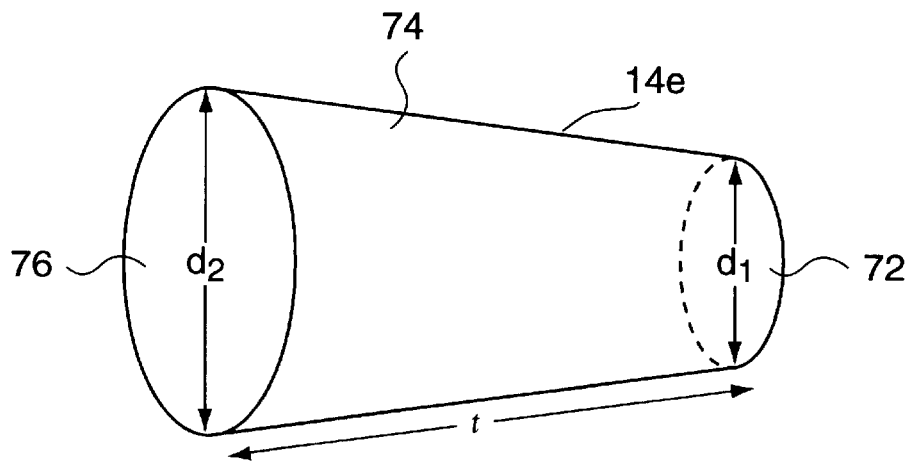
FIG. 7 is a diagrammatic perspective view of an inventive embodiment of an apertured conical-type bumper.
Figure 8:
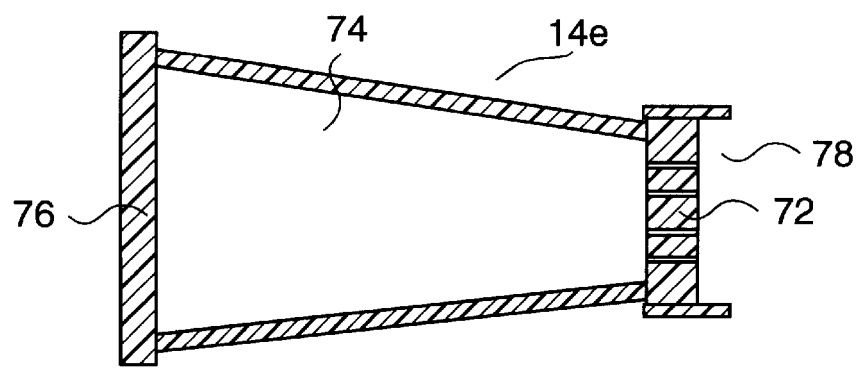
FIG. 8 is a diagrammatic longitudinal cross sectional view of the inventive embodiment shown in FIG. 7.
Figure 9:
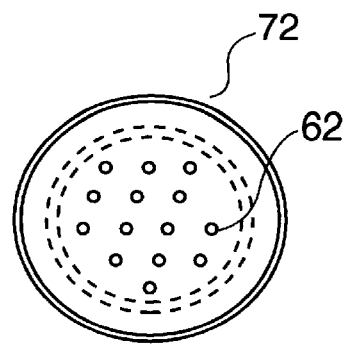
FIG. 9 is a diagrammatic elevation view of an end portion of the inventive embodiment shown in FIG. 7.
Figure 10:
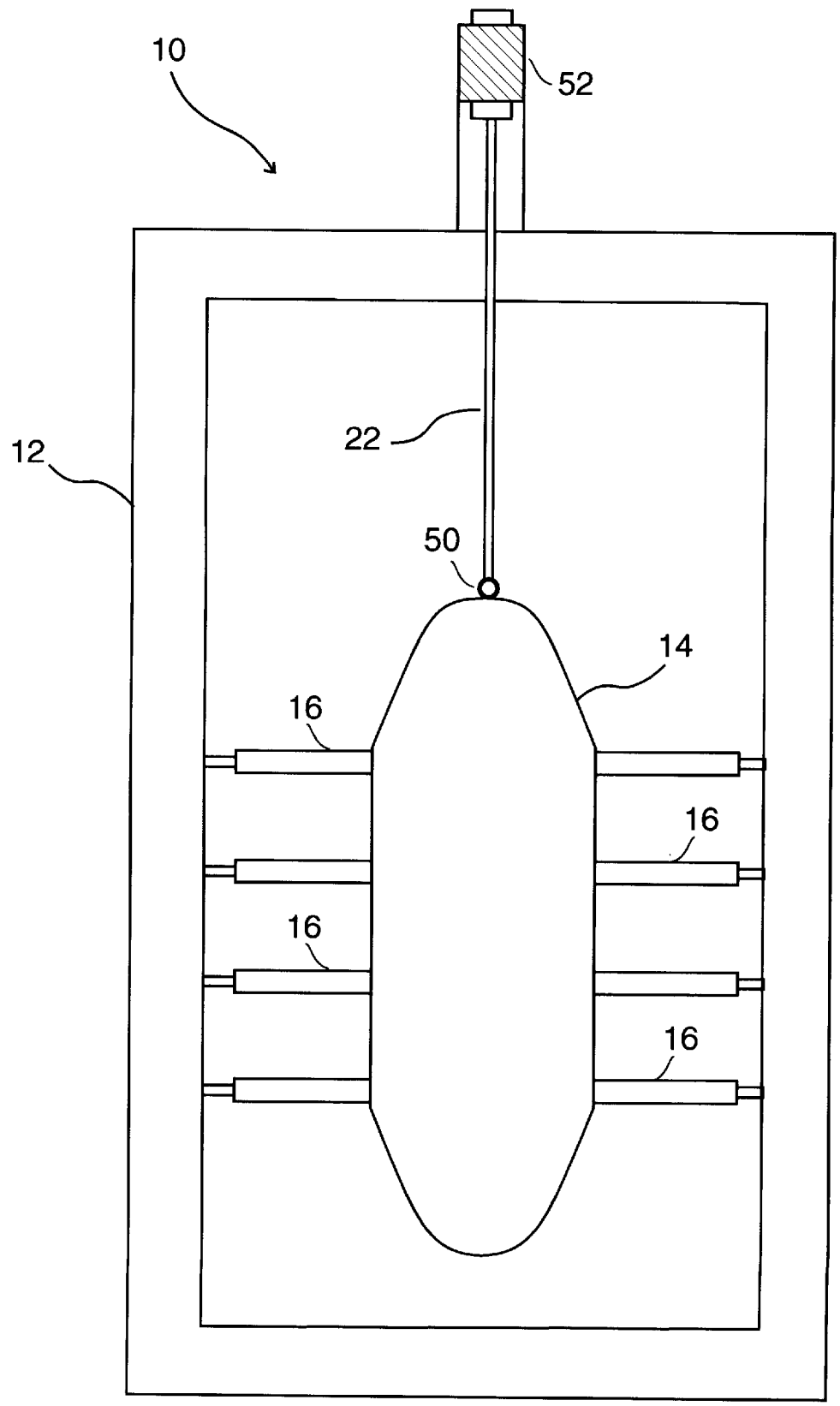
FIG. 10 is a diagrammatic front elevation view of an another embodiment of an inventive bumper system.

Referring to FIG. 7 through FIG. 9, hydraulic buckling conical-type fender 14e is designed for end loading. Conical fender 14e includes smaller disk-shaped cap 72, conical segment 74 and larger disk-shaped cap 76. Polyurethane cap 72 has provided therein a distribution of orifices 62. Conical segment 74 is made of filament wound polyurethane/glass material. Cap 72 is bonded and sealed with respect to conical segment 74 using RTV rubber, and is situated at the front (impact-taking) side 78 of conical fender 14e. The relative dimensions of conical fender 14e as shown, in terms of ratio of cap 72 diameter $d_1$ to cap 76 diameter $d_2$ to conical portion 74 tapered length t is approximately $d_1=3$, $d_2=6$, and $t=4$.

Since apertured hydraulic bumpers (such as fender 14 shown in FIG. 5 and FIG. 6 and fender 14e shown in FIG. 7 through FIG. 9) operationally exert a hydrodynamic force which supplements a mechanical force, it may be preferable for some inventive embodiments that the tension tubes (such as tension tubes 16) be more tightly secured, thereby promoting the hydrodynamic effectiveness of the water jets. In fact, utilization of an inventive apertured hydraulic bumper wherein a hard solid wall-like structure is used instead of one or more tension tubes may be worthy of further consideration.

In accordance with the present invention, a reaction fender can be any hollow composite structure, containing material which is gaseous, liquid or foam, having a circumferential surface about its imaginary longitudinal axis, and including fiber-reinforced high strain-to-failure viscoelastic matrix material. A structure which is said herein to have a circumferential surface about its longitudinal axis is intended herein to refer not only to a structure having a curvilinear surface which is axially symmetrical about a longitudinal axis, but to also refer to a structure having a generally curvilinear surface or a substantially curvilinear surface which is generally symmetrical or substantially symmetrical about a longitudinal axis.

Although the method, apparatus and system according to this invention admit of application to structures having aspects of asymmetricality and rectilinearity, many applications thereof preferably are for structures which substantially are axially symmetrical structures and hence better advance the fabrication, analysis, tailoring and system mechanics in accordance with this invention. Such structures include those of which a substantial portion is, approximately, a circular cylinder (e.g., fender 14 shown in FIG. 1 through FIG. 4), non-circular (e.g., flattened, oblate or elliptical) cylinder, circular conical segment, non-circular (e.g., flattened, oblate or elliptical) conical segment, sphere, prolate sphere, circular spheroid, non-circular (e.g., flattened, oblate or elliptical) spheroid, circular ellipsoid and non-circular (e.g., flattened, oblate or elliptical) ellipsoid. The circumferential planar cross-sections for these axially symmetrical structures are approximately either circular or non-circular (e.g., flattened, oblate or elliptical). A "cylindroid" structure is one of which a substantial portion approximately is a circular cylinder or a non-circular cylinder.

Many composite bumper structures for which the present invention may be practiced have shapes which are substantial or general analogues of these axially symmetrical shapes and which lend themselves to fabrication via conventional filament winding technique. Even rectangular and other entirely rectilinear structural shapes admit of practice in accordance with the present invention, lending themselves to fabrication via conventional RTM technique; such rectilinear bumpers would preferably have an identifiable axis of virtual symmetry so as to promote fabricability, tailorability, analyzability and mechanical viability in accordance with the teachings of the present invention.

In accordance with this invention, depending on the requirements for a given application, a bumper structure of any shape can be suspended at any height, and a bumper structure of non-spherical shape can be suspended in any orientation. For example, a cylindroid bumper (such as shown in FIG. 1 through FIG. 4) can be oriented approximately horizontally (such as shown in FIG. 1 through FIG. 4), approximately vertically, or obliquely, i.e., at any angle with respect to horizontality and/or verticality in three dimensional space.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. An apparatus for absorbing the impact of a relatively moving body, said apparatus comprising at least two composite structures and at least one housing, each said composite structure including fiber-reinforced high strain-to-failure viscoelastic matrix material and having a fiber content of at least approximately fifty percent by volume, at least one said composite structure being a bumper for initially receiving said body, at least one said composite structure being an elongate deformer for consequently receiving said bumper, each said elongate deformer having two ends, said at least one housing being for securing at least one said elongate deformer at its two ends and for suspending at least one said bumper, each said bumper being situated adjacent at least one said elongate deformer, each said bumper being deformable in a buckling manner, each said bumper thereby being energy absorptive upon said initially receiving said body, each said elongate deformer being deformable in a tensile manner, each said elongate deformer thereby being energy absorptive upon said consequently receiving said bumper.

2. The apparatus for absorbing impact as in claim 1, wherein at least one said bumper includes a substantial portion which is approximately symmetrical with respect to an imaginary longitudinal axis.

3. The apparatus for absorbing impact as in claim 1, wherein at least one said bumper is hollow and contains a material selected from the group consisting of gaseous material, liquid material and foam material.

4. The apparatus for absorbing impact as in claim 3, wherein at least one said bumper contains water and has a plurality of apertures for exerting a hydrodynamic force against said body upon said initially receiving said body.

5. The apparatus for absorbing impact as in claim 4 wherein said bumper is a cylindroid bumper having a cylindrical portion and two curved end portions, and wherein said apertures are approximately longitudinally arranged along said cylindrical portion.

6. The apparatus for absorbing impact as in claim 4, wherein said bumper is a conical-type bumper having a conical segment, a smaller disk-shaped end portion and a larger disk-shaped end portion, and wherein said apertures are arranged in said smaller disk-shaped end portion.

7. The apparatus for absorbing impact as in claim 1, wherein:

at least one said bumper is a cylindroid bumper which includes a hollow cylindrical axially intermediate portion and two protuberant axially extreme portions, said cylindroid bumper being approximately horizontally disposed; and at least two said elongate deformers are tubular deformers which are associated with said cylindroid bumper, each said tubular deformer being fastened at both ends to said at least one housing and being approximately vertically disposed.

8. The apparatus for absorbing impact as in claim 7, comprising at least one pulley mechanism which is coupled with at least one said housing, said at least one pulley mechanism being for adjusting, in the approximately vertical direction, the disposition of at least one said cylindroid bumper with respect to said associated deformers.

9. The apparatus for absorbing impact as in claim 7, comprising at least one swivel mechanism which is coupled with at least one said housing, said at least one swivel mechanism being for rendering substantially freely rotatable at least one said tubular deformer.

10. The apparatus for absorbing impact as in claim 7, wherein at least one said cylindroid bumper contains air and is pressurized internally.

11. The apparatus for absorbing impact as in claim 7, wherein at least one said cylindroid bumper contains air and is substantially completely depressurized internally.

12. The apparatus for absorbing impact as in claim 7, wherein at least one said cylindroid bumper contains air and has at least one vent for said air.

13. The apparatus for absorbing impact as in claim 7, wherein at least one said cylindroid bumper contains water.

14. The apparatus for absorbing impact as in claim 7, wherein at least one said cylindroid bumper contains foam.

15. The apparatus for absorbing impact as in claim 7, wherein at least one said elongate deformer is a tubular deformer which:
   is associated with said cylindroid bumper;
   is fastened at both ends to said at least one housing;
   is approximately horizontally disposed; and
   engages at least one said associated tubular deformer which is approximately vertically disposed.

16. The apparatus for absorbing impact as in claim 1, wherein:
   at least one said bumper is a cylindroid bumper which includes a hollow cylindrical axially intermediate portion and two protuberant axially extreme portions, said cylindroid bumper being approximately vertically disposed; and
   at least two said elongated deformers are tubular deformers which are associated with said cylindroid bumper, each said tubular deformer being fastened at both ends to said at least one housing and being approximately horizontally disposed.

17. A method for absorbing the impact of an object, said method comprising the steps of:
   providing at least one composite bumper structure which includes a plurality of single-stranded tows and high strain-to-failure viscoelastic matrix material contiguously disposed in relation to at least some said tows, said composite bumper structure having a content of said tows of at least approximately fifty percent by volume;
   providing at least one composite elongate deformer structure which includes a plurality of single-stranded tows and high strain-to-failure viscoelastic matrix material contiguously disposed in relation to at least some said tows, each said composite elongate deformer structure having a content of said tows of at least approximately fifty percent by volume, each said composite elongate deformer structure being characterized by two ends;
   providing at least one housing, for said at least one composite bumper structure and said at least one composite elongate deformer structure;
   securing each said composite elongate deformer structure at its two ends with respect to said at least one housing; and
   suspendedly positioning each said composite bumper structure, said composite elongate deformer structure being situated proximate said composite bumper structure so that, when said object strikes said composite bumper structure, said composite bumper structure buckles and strikes said at least one composite deformer structure, whereupon each said composite deformer structure which said composite bumper strikes tenses, said composite bumper structure and each said composite deformer being absorptive of said impact.

18. The method for absorbing impact as in claim 17, wherein said suspendedly positioning includes adjusting the height, relative to said housing, of at least one said composite bumper structure.

19. The method for absorbing impact as in claim 17 wherein:
   said providing at least one said composite bumper structure includes providing a cylindroid composite bumper structure which includes a hollow cylindrical axially intermediate portion and two protuberant axially extreme portions;
   said providing at least one said composite elongate deformer structure includes providing at least two tubular composite deformer elongate structures;
   said suspendedly positioning includes disposing said cylindroid composite bumper structure approximately horizontally; and
   said securing includes, for at least one said tubular composite elongate deformer structure, fastening said tubular composite elongate deformer structure at both ends to said at least one housing and disposing said tubular composite deformer structure approximately vertically.

20. The method for absorbing impact as in claim 19, wherein said securing includes, for at least one said tubular composite elongate deformer structure, fastening said tubular composite deformer structure at both ends to said at least one housing and disposing said tubular composite deformer structure approximately horizontally so as to engage at least one said tubular composite elongate deformer structure which is disposed approximately vertically.

21. The method for absorbing impact as in claim 19, wherein, for at least one said tubular composite elongate deformer structure, said fastening includes providing substantially free rotatability of said tubular composite elongate deformer structure.

22. An energy absorption system responsive to the impacting motion of a body such as a marine vessel, comprising:
   a bumper structure, said bumper structure having a hollow portion and containing a material in said hollow portion, said material selected from the group consisting of gaseous material, liquid material and foam material, said bumper structure including fiber-reinforced highly viscoelastic matrix material and having a content of fibers of at least about fifty percent by volume;
   plural slender cylindrical members, each said slender cylindrical member having two ends, each said slender cylindrical member including fiber-reinforced highly viscoelastic matrix material and having a content of fibers of at least about fifty percent by volume, said slender cylindrical members being disposed in approximately the same approximately vertical plane; and
   means for suspending said bumper structure and for securing each said slender cylindrical member at its said two ends so as to place said bumper structure proximate said slender cylindrical members;
   said bumper structure being capable of buckling and of impacting said slender cylindrical members when said body impacts said bumper structure, said bumper structure thereby absorbing energy;

said slender cylindrical members being capable of stretching, bending and necking when said bumper structure impacts said slender cylindrical members, said slender cylindrical members thereby absorbing energy.

23. The energy absorption system as in claim 22 wherein, during said stretching, bending and necking of said slender cylindrical members, there is a degree of reorientation of said fibers of said slender cylindrical members, there is a degree of compression of said highly viscoelastic matrix material of said slender cylindrical members, and said slender cylindrical members stiffen.

24. The energy absorption system as in claim 23 wherein said slender cylindrical members stiffen by a magnitude in the range between about two orders of magnitude and about three orders of magnitude.

25. The impact energy absorption system as in claim 23 wherein said slender cylindrical members increasingly stiffen over a period of several seconds so as to become increasingly resistant to the motion of said body.

* * * * *